United States Patent [19]

Akiyama et al.

[11] Patent Number: 5,103,000

[45] Date of Patent: Apr. 7, 1992

[54] PACKING FOR CHROMATOGRAPHY AND METHOD FOR SEPARATING WATER SOLUBLE ORGANIC COMPOUNDS USING THE SAME

[75] Inventors: Shuzo Akiyama, Nagasaki; Kenichiro Nakashima, Nagasaki; Yasumi Shimizu, Kawanishi; Yutaka Kamada, Osaka; Junichi Kadoya, Amagasaki, all of Japan

[73] Assignee: Daiso Co., Ltd., Osaka, Japan

[21] Appl. No.: 579,709

[22] Filed: Sep. 10, 1990

[30] Foreign Application Priority Data

Sep. 13, 1989 [JP] Japan .................... 1-237762

[51] Int. Cl.$^5$ .................... C07F 7/02; C07F 7/10; C02F 1/28
[52] U.S. Cl. .................... 544/69; 544/229; 546/14; 356/413; 210/656
[58] Field of Search .................... 556/413; 544/69, 229; 546/14; 210/656

[56] References Cited

U.S. PATENT DOCUMENTS

| 4,847,159 | 7/1989 | Glajch et al. ............... 428/447 |
| 4,927,812 | 5/1990 | Carson et al. ............... 514/63 |
| 4,948,888 | 8/1990 | Greco et al. ............... 544/69 |

FOREIGN PATENT DOCUMENTS

| 0150221 | 8/1985 | European Pat. Off. . |
| 0165912 | 12/1985 | European Pat. Off. . |
| 0758168 | 10/1956 | United Kingdom ............... 546/14 |
| 8706233 | 10/1987 | World Int. Prop. O. . |
| 8908257 | 9/1989 | World Int. Prop. O. . |

*Primary Examiner*—Jose G. Dees
*Assistant Examiner*—Porfirio Nazario
*Attorney, Agent, or Firm*—Wegner, Cantor, Mueller & Player

[57] ABSTRACT

A packing for use in chromatography which comprises a cyclic amino-substituted silane compound having the formula (I):

$$R^2-\underset{\underset{R^3}{|}}{\overset{\overset{R^1}{|}}{Si}}-(CH_2)_n-R^4 \qquad (I)$$

wherein $R^1$, $R^2$ and $R^3$ are the same or different and are each an alkyl having 1 to 5 carbon atoms, an alkoxy having 1 to 3 carbon atoms, hydroxy or a halogen atom in which at least one of $R^1$, $R^2$ and $R^3$ are an alkoxy group or a halogen atom; $R^4$ is $\omega$-piperidino, $\omega$-piperazino or $\omega$-morpholino group which is optionally substituted by a straight chain or branched chain lower alkyl group; n is an integer of from 2 to 10, said compound being grafted onto an inorganic carrier having hydroxyl group on its surface, and a method for separating water soluble organic compounds by chromatography using said packing.

3 Claims, 4 Drawing Sheets

PACKING FOR CHROMATOGRAPHY AND METHOD FOR SEPARATING WATER SOLUBLE ORGANIC COMPOUNDS USING THE SAME

The present invention relates to a novel packing for chromatography and a method for separating water soluble organic compounds by chromatography using the packing. The packing of the present invention is useful in various fields such as food analysis and clinical analysis.

PRIOR ART

In the field of food analysis and clinical analysis, there have recently been reported several studies as to simultaneous analysis of vitamins which can be done by simple, rapid and practical procedure. Such reports include, for example, a reversed phase chromatography using a packing wherein an octadecyl group (C18) is grafted onto silica gel [Maeda et al., J. Assoc. Off. Anal. Chem., 72, 244 (1989); Amin et al., Pharm. Ind., 50, 1307 (1988)] and a chromatography using a packing wherein the above C18 or aminopropyl group is grafted onto silica gel [R. B. H. Wills et al., J. Chromatogr. Sci., 15, 262 (1977)] and the like.

However, these methods are not practically useful since they are disadvantageous in that the compounds which can be separated by these methods are limited, or resolution of the compounds to be analyzed is not sufficiently high, or it takes a long time for analysis.

Furthermore, in conventional methods, an aqueous solution containing an organic solvent (e.g. acetonitrile, methanol etc.) is to be used as a mobile phase, and hence, they have problems in the treatment of waste materials produced after separation procedure and further the restricted selection of a wave length for an ultraviolet detector. In addition, in case of analysis of samples containing a considerable amount of an inorganic salt such as a transfusion liquid, the salt is precipitated by an organic solvent used for analysis, and as a result, it becomes sometimes difficult to conduct the analysis.

SUMMARY DESCRIPTION OF THE INVENTION

Under the circumstances, the present inventors have intensively studied as to development of a practically useful packing for simultaneous analysis of water soluble compounds, especially vitamins, said packing being applicable to analysis of a wide range of compounds, enabling a highly resolvable separation, and requiring only a short time for analysis, and a method for separating water soluble organic compounds by chromatography using a mobile phase containing no organic solvent. As a result, the present inventors have found that a packing for chromatography comprising a specific cyclic amino-substituted silane compound grafted onto an inorganic carrier satisfies the above requirements and is effective for separation of various water soluble organic compounds such as vitamins.

An object of the present invention is to provide a packing for use in chromatography which comprises a cyclic amino-substituted silane compound of the formula (I):

$$R^2-\underset{\underset{R^3}{|}}{\overset{\overset{R^1}{|}}{Si}}-(CH_2)_n-R^4 \quad (I)$$

wherein $R^1$, $R^2$ and $R^3$ are the same or different and are each an alkyl having 1 to 5 carbon atoms, an alkoxy having 1 to 3 carbon atoms, hydroxy or a halogen atom in which at least one of $R^1$, $R^2$ and $R^3$ are an alkoxy group or a halogen atom; $R^4$ is ω-piperidino, ω-piperazino or ω-morpholino group which is optionally substituted by a straight chain or branched chain lower alkyl group; n is an integer of from 2 to 10, said compound being grafted onto an inorganic carrier having a hydroxyl group on its surface.

Another object of the present invention is to provide a method for separating water soluble compounds, especially vitamins, by chromatgraphy using said packing.

These and other objects and advantages of the invention will be apparent to those skilled in the art from the following description.

DETAILED DESCRIPTION OF THE INVENTION

Figure 1:
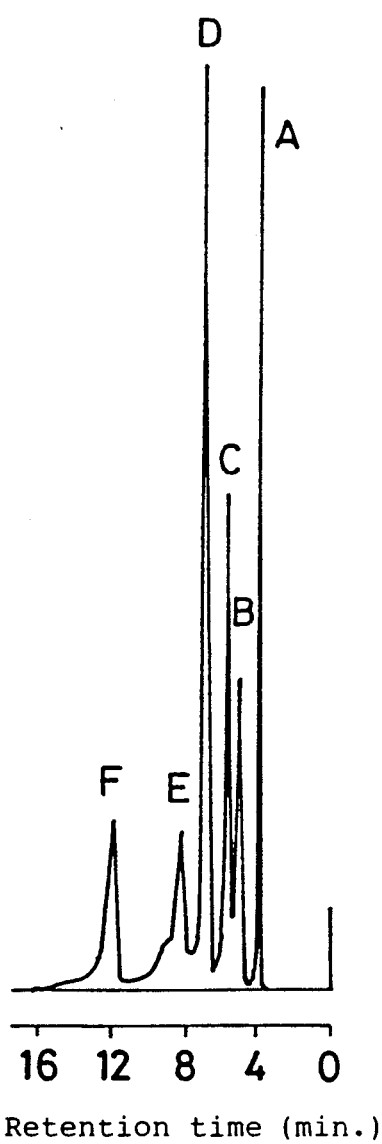
FIGS. 1, 2, 3, 4 and 5 are each chromatograms obtained by analysis in Examples 5, 6, 7, 8 and 9, respectively.

In the cyclic amino-substituted silane compound of the general formula (I), $R^1$, $R^2$ and $R^3$ are the same or different and each represents an alkyl group having 1 to 5 carbon atoms (e.g. methyl, ethyl, propyl, butyl, pentyl, etc.), an alkoxy group having 1 to 3 carbon atoms (e.g. methoxy, ethoxy, propoxy, etc.), hydroxy, or a halogen atom (e.g. fluorine, chlorine, bromine, etc.). $R^4$ represents a ω-piperidino, ω-piperazino or ω-morpholino group, which may optionally be substituted by a straight chain or branched chain alkyl group having 1 to 4 carbon atoms such as methyl, ethyl, propyl, isopropyl, butyl, isobutyl, sec-butyl, tertbutyl, etc.

The cyclic amino-substituted silane compound includes, but is not limited to, dimethyl(3-piperidinopropyl)methoxysilane, methyl(3-piperidinopropyl)dimethoxysilane, 3-piperidinopropyltrimethoxysilane, 3-piperidinopropyltriethoxysilane, dimethyl(3-piperazinopropyl)methoxysilane, methyl(3-piperazinopropyl)dimethoxysilane, 3-piperazinopropyltrimethoxysilane, 3-piperazinopropyltriethoxysilane, dimethyl(3-morpholinopropyl)methoxysilane, methyl(3-morpholinopropyl)dimethoxysilane, 3-morpholinopropyltrimethoxysilane, 3-morpholinopropyltriethoxysilane, 10-morpholinodecyltriethoxysilane, 3-(2-methylpiperidino)propyltrimethoxysilane, 3-(3-methylpiperidino)propyltrimethoxysilane, 3-(4-methylpiperidino)propyltrimethoxysilane, 3-(2-ethylpiperidino)propyltrimethoxysilane, 3-(3-ethylpiperidino)propyltrimethoxysilane, 3-(2-isopropylpiperidino)propyltrimethoxysilane, 3-(N-methylpiperazino)propyltrimethoxysilane, methyl(3-piperidinopropyl)dichlorosilane, 3-piperidinopropyltrichlorosilane, methyl(3-piperazinopropyl)dichlorosilane, 3-piperazinopropyltrichlorosilane, methyl(3-morpholinopropyl)dichlorosilane, 3-morpholinopropyltrichlorosilane, 10-morpholinodecyltrichlorosilane, etc.

The packing for chromatography of the present invention can be prepared by heating a mixture of the cyclic amino-substituted silane compound (I) as a silane coupling agent and an inorganic carrier having a hydroxy group on its surface in the presence or absence of an organic solvent. After completion of the reaction, the obtained packing can optionally be end-capped using a silane compound selected from trimethylchlorosilane, trimethylmethoxysilane and hexamethyldisilazane or a combination thereof.

The inorganic carrier having a hydroxy group on its surface used in the present invention includes silica gel, alumina gel, zirconia gel, glass beads and the like, among which silica gel is preferable. The hydroxy groups on the surface are reactive with the cyclic amino-substituted silane compound (I) and allow for grafting of the cyclic amino-substituted silane compound (I) onto the inorganic carrier.

Although the inorganic carrier used in the present invention may be in any shape including globular or pulverized form, a preferred one is fine particles having a uniform particle size in order to obtain a chromatography column having high efficiency.

The organic solvent used in the present invention includes benzene, toluene, xylene, chlorobenzene, hexane, cyclohexane, chloroform, tetrahydrofuran, dimethylformamide, dimethyl sulfoxide, and the like.

The reaction is preferably carried out at a temperature of from 50° to 150° C. After completion of the reaction, the mixture is cooled to room temperature, filtered and the filtrate is washed with an organic solvent (e.g. toluene, acetone, ether, etc.) or pure water and then dried at a temperature below 80° C. at atmospheric pressure or under reduced pressure in accordance with a conventional procedure to give the packing for chromatography of the present invention. The cyclic amino-substituted silane compound is suitably grafted onto the inorganic carrier in an amount ranging from 0.1 to 4 mmol/g inorganic carrier.

The thus prepared packing having a basic group of the present invention is filled in a chromatography column in the conventional manner and used as a stationary phase in liquid chromatography.

By liquid chromatography using the stationary phase of the present invention, various water soluble organic compounds can be separated and analyzed with a high resolution and in a short time period under a suitable elution condition, especially by using an aqueous solution as an eluent.

The mobile phase used in chromatography of the present invention includes water, or an aqueous solution of acetonitrile, methanol, ethanol etc., or a phosphate or borate buffer in which phosphoric acid-phosphate or boric acid-borate are dissolved in the above water or aqueous solution. The above aqueous solution is optionally added with an ion-pair reagent. A most preferable mobile phase used in chromatography of the present invention is a 0.05 to 0.7M phosphate buffer aqueous solution in which 1 to 100 mM ion-pair reagent is dissolved.

The ion-pair reagent used in the present invention includes tetrabutyl ammonium fluoride, tetrabutyl ammonium chloride, tetrabutyl ammonium bromide, tetrabutyl ammonium iodide, tetrabutyl ammonium hydroxide, tetraethyl ammonium fluoride, tetraethyl ammonium chloride, tetraethyl ammonium bromide, tetraethyl ammonium iodide, tetraethyl ammonium hydroxide, tetramethyl ammonium fluoride, tetramethyl ammonium chloride, tetramethyl ammonium bromide, tetramethyl ammonium iodide, tetramethyl ammonium hydroxide, hexyltrimethyl ammonium chloride, hexyltrimethyl ammonium bromide, octyltrimethyl ammonium chloride, octyltrimethyl ammonium bromide, decyltrimethyl ammonium chloride, decyltrimethyl ammonium bromide, cetyltrimethyl ammonium chloride, cetyltrimethyl ammonium bromide, sodium pentanesulfonate, sodium octanesulfonate, sodium laurylsulfate, sodium dodecylsulfate, and the like.

The aqueous solution of phosphate buffer usually comprises phosphoric acid, disodium hydrogen phosphate and sodium dihydrogen phosphate and the solution can be adjusted at any pH value within a range of 2 to 9 by altering an amount of each component.

The water soluble organic compound separable by chromatography of the present invention includes water soluble vitamins, amino acids, peptides, nucleic acids, saccharides and the like.

The above vitamins include thiamine (hydrochloride), riboflavin, flavin adenine dinucleotide, nicotinic acid (amide), folic acid, pantothenic acid, lipoic acid, pyridoxine (hydrochloride), pyridoxal (hydrochloride), pyridoxamine (hydrochloride), pyridoxine 5'-phosphate, pyridoxal 5'-phosphate, pyridoxamine 5'-phosphate, cyanocobalamine, hydroxocobalamine (acetate), methylcobalamine, adenosylcobalamine, aquacobalamine, biotin, ascorbic acid, riboflavin phosphate ester and the like.

The above amino acids include glycine, alanine, valine, serine, threonine, cysteine, methionine, phenylalanine, tryptophan, tyrosine, proline, cystine, glutamic acid, aspartic acid, asparagine, glutamine, lysine, arginine, histidine, etc.

The above pepetides include methionine enkephalin, leucine enkephalin, kyotorophin, and the like.

The above nucleic acids include nucleic acid bases (e.g. adenine, guanine, cytosine, uracil, thymine, etc.), nucleosides (e.g. guanosine, adenosine, cytidine, uridine, deoxycytidine, thymidine, etc.), nucleotides (e.g. 2'-adenosine monophosphate (abbreviated as "AMP"), 3'-AMP, 5'-AMP, adenosine diphosphate (abbreviated as "ADP"), adenosine triphosphate (abbreviated as "ATP"), 5'-cytidine monophosphate (abbreviated as "CMP"), cytidine diphosphate (abbreviated as "CDP"), cytidine triphosphate (abbreviated as "CTP"), 5'-uridine monophosphate (abbreviated as "UMP"), uridine diphosphate (abbreviated as "UDP"), uridine triphosphate (abbreviated as "UTP"), 2'-guanosine monophosphate (abbreviated as "GMP"), 3'-GMP, NADH, NAHPH, CoA, etc.), and the like.

The above saccharides include monosaccharides (e.g. arabinose, xylose, ribose, glucose, mannose, fructose, galactose, etc.), disaccharides (e.g. maltose, lactose, saccharose, trehalose, etc.), and the like.

The packing for chromatography of the present invention is useful for chromatographic separation of a wide range of water soluble organic compounds with a high resolution and in a short time.

Since chromatography of the present invention uses an aqueous solution containing no organic solvent as a mobile phase, it does not require disposal of waste liquid after separation and any wave length can be selected with no limitation when a ultraviolet detector is used. Therefore, the chromatography of the present invention is highly practical with high performance and resolution.

The present invention is illustrated in more detail by the following Examples but should not be construed to be limited thereto.

EXAMPLE 1

A 300 ml flask was charged with toluene (300 ml) and silica gel ("Daiso-Gel SP-120" manufactured by DAISO CO., LTD., mean particle size: 5 μm; 10.0 g) and the mixture was refluxed for 28 hours while water was removed as azeotropic mixture with toluene.

After cooling the mixture to room temperature, 3-morpholinopropyltrimethoxysilane (25 g) was added and the mixture was refluxed for 24 hours. After cooling the mixture to room temperature, the mixture was filtered and the filtrate was washed with toluene, acetonitrile and ether in this order and dried under reduced pressure to give a gel.

Elementary analysis of the obtained gel showed C: 7.89%, H: 1.54% and N: 1.20% and a grafted amount calculated from the elementary analysis of nitrogen was 0.86 mmol/g.

EXAMPLE 2

In the same manner as in Example 1, a mixture of silica gel (10.0 g) and 3-morpholinopropyltrimethoxysilane (25 g) was refluxed for 24 hours. After cooling to room temperature, a mixture of trimethylchlorosilane (3.68 g) and hexamethyldisilazane (5.43 g) was added dropwise to the above reaction solution, and after completion of dropwise addition, the mixture was refluxed for 5 hours.

After cooling to room temperature, the mixture was filtered and the filtrate was washed with toluene, acetone and ether in this order and then with acetone. Washing was further repeated with pure water, acetone and ether in this order and then dried at 80° C. to give an end-capped gel.

Elementary analysis of the obtained gel showed C: 8.50%, H: 1.65% and N: 1.36%.

EXAMPLE 3

The procedure in Example 1 was repeated except that 3-piperazinopropyltrimethoxysilane was used in place of 3-morpholinopropyltrimethoxysilane to give a gel where 3-piperazinopropyl group was grafted.

Elementary analysis of the obtained gel showed C: 7.92%, H: 1.64% and N: 2.42% and a grafted amount calculated from the elementary analysis of nitrogen was 0.86 mmol/g.

EXAMPLE 4

The procedure in Example 1 was repeated except that 3-piperidinopropyltrimethoxysilane was used in place of 3-morpholinopropyltrimethoxysilane to give a gel where a 3-piperidinopropyl group was grafted.

Elementary analysis of the obtained gel showed C: 8.47%, H: 1.68% and N: 1.19% and a grafted amount calculated from the elementary analysis of nitrogen was 0.85 mmol/g.

EXAMPLE 5

The packing obtained in Example 1 was filled in a stainless column (inner diameter: 4.6 mm, length: 150 mm) by slurry technique in a glycerin/methanol (4:6 v/v) solution, and analysis of a sample as mentioned below was conducted under the following conditions. The obtained results are shown in FIG. 1 as a chromatogram.

Temperature: room temperature

Mobile phase: a mixture of 0.1M phosphate buffer (0.1M $H_3PO_4$ + 0.1M $Na_2HPO_4$) adjusted at pH 6.0 and 10 mM tetrabutyl ammonium bromide Flow rate: 1.0 ml/min.

Detector: ultraviolet spectrophotometer (wave length: 270 μm)

Sample used in the analysis was a mixture of the following compounds:

(A) Ascorbic acid
(B) Pyridoxine hydrochloride
(C) Nicotinic acid
(D) Flavin adenine dinucleotide
(E) Hydroxocobalamine acetate
(F) Thiamine hydrochloride

EXAMPLE 6

Figure 2:
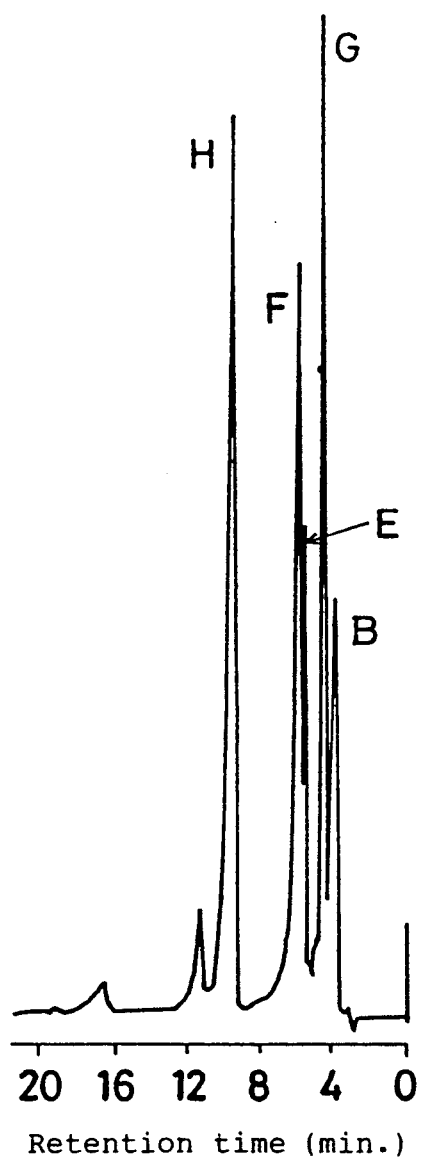

Analysis was conducted using the column of Example 5 under the same conditions as in Example 5 except that the phosphate buffer adjusted to pH 5.0 was used as the mobile phase. The results are shown in FIG. 2 as a chromatogram.

Sample used in the analysis was a mixture of the following compounds:

(B) Pyridoxine hydrochloride
(E) Hydroxocobalamine acetate
(F) Thiamine hydrochloride
(G) Nicotinic acid amide
(H) Riboflavin phosphate ester

EXAMPLE 7

Figure 3:
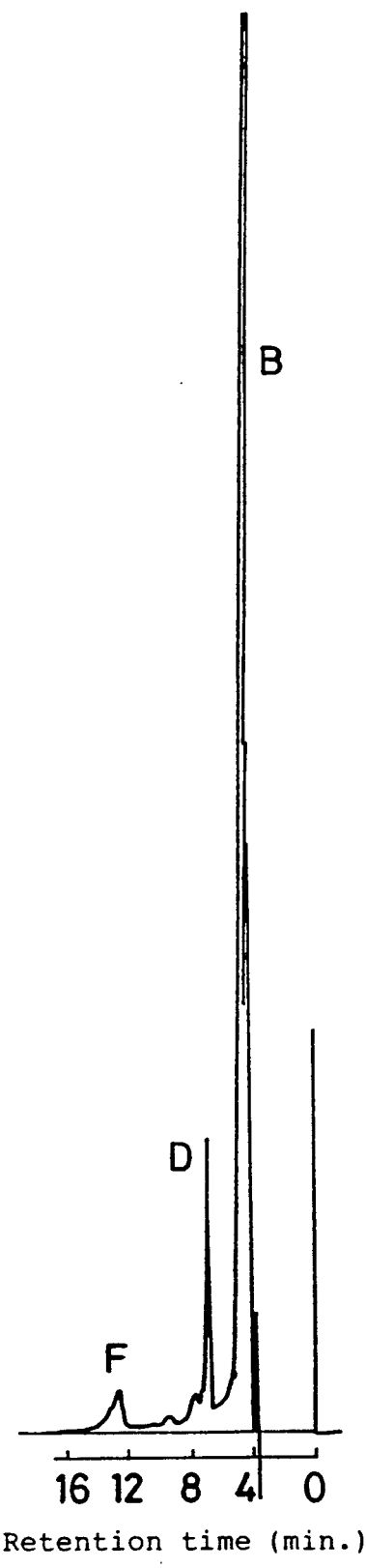

Analysis of commercially available vitamin nutrients was conducted using the same column and conditions as in Example 5. The results are shown in FIG. 3 as a chromatogram. In FIG. 3, the peaks B, D and F correspond to pyridoxine, flavin adenine dinucleotide and thiamine, respectively.

EXAMPLE 8

Each packing obtained in Examples 3 and 4 was filled in a stainless column (inner diameter: 4.6 mm; length: 150 mm) by slurry technique in a glycerin/methanol (4:6 v/v) solution and analysis was conducted using the same sample and conditions as in Example 5. The results are shown in FIG. 4 as a chromatogram.

Figure 4:
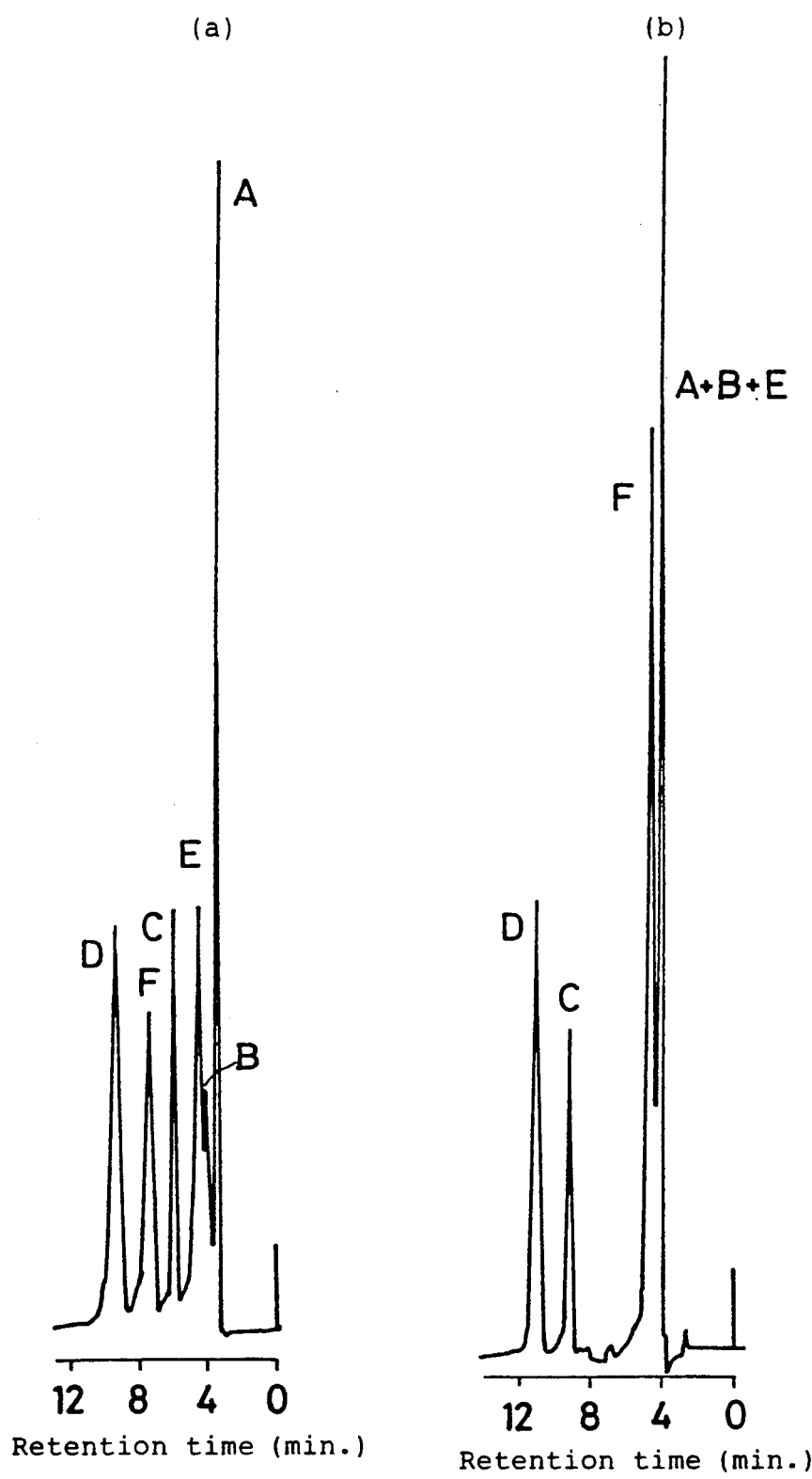

In FIG. 4, (a) and (b) show chromatograms obtained by using the packings of Examples 3 and 4, respectively.

EXAMPLE 9

Figure 5:
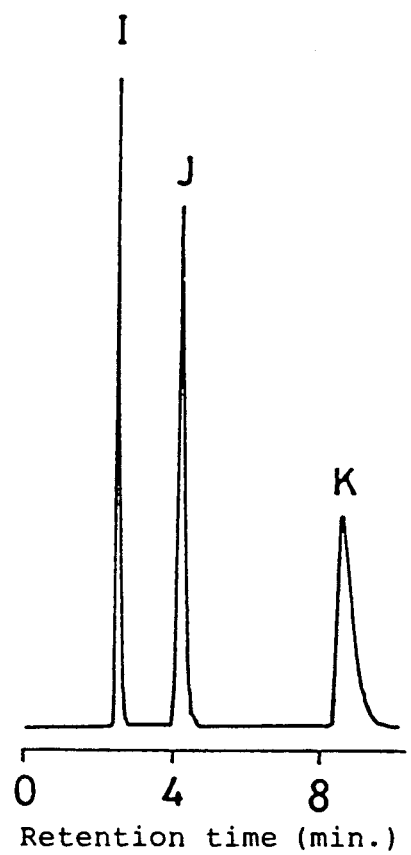

The packing obtained in Example 1 was filled in a stainless column (inner diameter: 6.0 mm, length: 150 mm) by slurry technique in a glycerin/methanol (4:6 v/v) solution and analysis of the sample as mentioned below was conducted under the following conditions. The obtained results are shown in FIG. 5 as a chromatogram.

Temperature: room temperature

Mobile phase: a mixture of 0.5M potassium phosphate and 10 mM tetrabutyl ammonium bromide Flow rate: 2.0 ml/min.

Detector: ultraviolet spectrophotometer (wave length: 254 μm)

Sample used in the analysis was a mixture of the following compounds:

(I) 5'-AMP
(J) ADP
(K) ATP

What is claimed is:

1. A packing for use in chromatography which comprises a cyclic amino-substituted silane compound of the formula (I):

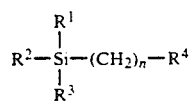

wherein $R^1$, $R^2$ and $R^3$ are the same or different and are each an alkyl having 1 to 5 carbon atoms, an alkoxy having 1 to 3 carbon atoms, hydroxy or a halogen atom in which at least one of $R^1$, $R^2$ and $R^3$ is an alkoxy group or a halogen atom; $R^4$ is ω-piperidino, ω-piperazino or ω-morpholino group which is optionally substituted by a straight chain or branched chain alkyl group having 1 to 4 carbon atoms; n is an integer of from 2 to 10, said compound being grafted onto an inorganic carrier having hydroxyl group on its surface.

2. The packing according to claim 1 wherein the inorganic carrier is a silica gel.

3. The packing according to claim 1 wherein the cyclic amino-substituted silane compound is a member selected from the group consisting of dimethyl(3-piperidinopropyl)methoxysilane, methyl(3-piperidinopropyl)dimethoxysilane, 3-piperidinopropyltrimethoxysilane, 3-piperidinopropyltriethoxysilane, dimethyl(3-piperazinopropyl)methoxysilane, methyl(3-piperazinopropyl)dimethoxysilane, 3-piperazinopropyltrimethoxysilane, 3-piperazinopropyltriethoxysilane, dimethyl(3-morpholinopropyl)methoxysilane, methyl(3-morpholinopropyl)dimethoxysilane, 3-morpholinopropyltrimethoxysilane, 3-morpholinopropyltriethoxysilane and 10-morpholinodecyltriethoxysilane.

* * * * *